United States Patent [19]

Murakami et al.

[11] Patent Number: 5,210,632

[45] Date of Patent: May 11, 1993

[54] SIGNAL TRANSMISSION SYSTEM HAVING A STAR COUPLED REPEATER

[75] Inventors: Toshiyuki Murakami, Hitachi; Sadao Mizokawa, Katsuta; Hisayuki Maruyama, Ebina; Masato Satake, Ibaraki; Masanori Kogawa, Hitachi; Naomasa Hanano, Ibaraki, all of Japan

[73] Assignees: Hitachi, Ltd. Hitachi Cable, Ltd., Tokyo; Hitachi Process Computer Engineering, Inc., Hitachi, both of Japan

[21] Appl. No.: 526,713

[22] Filed: May 22, 1990

[30] Foreign Application Priority Data

May 26, 1989 [JP] Japan .................. 1-131274

[51] Int. Cl.⁵ .................................. H04B 10/02
[52] U.S. Cl. ........................ 359/178; 359/174; 359/135; 340/825.05; 340/825.5
[58] Field of Search ............... 455/602, 601, 607, 606, 455/612; 370/4, 1, 26, 97, 35; 375/3; 359/174, 178, 177, 118, 120-121, 135, 152; 340/825.05, 825.5

[56] References Cited

U.S. PATENT DOCUMENTS

| | | | |
|---|---|---|---|
| 4,581,770 | 4/1986 | Haworth | 455/607 |
| 4,646,361 | 2/1987 | Usui | 455/607 |
| 4,654,889 | 3/1987 | Shutterly | 455/601 |
| 4,709,416 | 11/1987 | Patterson | 455/607 |
| 4,826,275 | 5/1989 | Heinzman | 455/612 |
| 4,876,695 | 10/1989 | Witters et al. | 375/3 |

FOREIGN PATENT DOCUMENTS 0188379 7/1986 European Pat. Off. ............ 455/601

Primary Examiner—Edward L. Coles, Jr.
Assistant Examiner—Kinfe-Michael Negash
Attorney, Agent, or Firm—Antonelli, Terry, Stout & Kraus

[57] ABSTRACT

A signal transmission system comprising an apparatus which inhibits the repeating in the opposite direction during reception and transmission of frames and which monitors the number of frames which were outputted in one direction from a repeater and the number of frames which were returned from such direction, whereby a destruction and circulation of the frame are inhibited without reducing response speed of a signal.

20 Claims, 9 Drawing Sheets

FIG. 6(a)
TOKEN FRAME

| PA | SD | FC | DA | SA | FCS | ED | PN |

FIG. 6(b)
DATA FRAME

| PA | SD | FC | DA | SA | DATA | FCS | ED | PN |

SIGNAL TRANSMISSION SYSTEM HAVING A STAR COUPLED REPEATER

BACKGROUND OF THE INVENTION

The present invention relates to a signal transmission system having a photo star coupler in a part of the system and, more particularly, to a signal transmission system which is suitable to block an echo back from the photo star coupler.

When a local network is constructed by a coaxial cable, a cable length of about 500 m is a limit value of communication. Therefore, a method of expanding the network by using an optical fiber has widely been used. As practical means of realizing such a method, there have been known a method whereby a plurality of local networks constructed by coaxial cables are coupled by optical fibers and a method whereby the coaxial cable is replaced by an optical fiber.

In the network for executing the bidirectional communication, not only a bus of the local network but also a connecting portion between buses of the local networks need a bidirectional communication path. In this case, when using the former expanding method (a plurality of local networks constructed by coaxial cables are connected by optical fibers), the local networks are not merely coupled by bidirectional optical fiber transmission paths, but they are coupled by using photo star couplers (hereinafter, simply referred to as star couplers). Three or more local networks can be coupled, so that it is advantageous in terms of preparation of the future expansion. On the other hand, when using the latter expanding method (the local networks are coupled by optical fibers in place of the coaxial cables and each terminal apparatus is connected to the optical fiber), a star coupler is used to form a bidirectional communication path between the terminal apparatuses.

The star coupler has a plurality of terminals and the terminals are all connected in the coupler. Therefore, when a photo signal is input to either one of the terminals, the photo input signal is distributed to the other terminals and an output. When a network is constructed by using such a star coupler and a bidirectional communication path is formed, a transmission fault called an echo back occurs.

That is, in the case where a first local network is connected between the first and second terminals of the star coupler and a second local network or a terminal apparatus is connected to the other terminal of the star coupler, a signal is sent from the first local network to the first terminal of the star coupler. There is a problem such that the system is influenced in a manner such that a transmission signal in the first local network is destroyed by a return signal from the second terminal of the star coupler or the return signal is again circulated.

A control to eliminate such an echo back is called an echo back inhibition control. Conventional examples in which such an inhibition control is executed have been disclosed in JP-A-62-157434 and JP-A-60-260246. According to the above prior arts, a repeater for executing a bidirectional communication is connected between the first and second terminals of a star coupler and a first local network, and in the repeater, a signal which is sent in the second direction opposite to the first direction of the star coupler is blocked for a period of time when the transmission signal in the first direction is detected and for a predetermined period of time after the time point when the transmission signal in the first direction is not detected. It is now considered that the signal which is sent in the second direction for such a period of time is called an echo back signal. By blocking such a signal, the transmission fault can be prevented.

In the above prior arts, the predetermined period of time from the time point when the transmission signal in the first direction is not detected is equal to the time which is required to reciprocate a signal between the repeater and the star coupler and such a time differs depending on a fiber length of each path. Therefore, each time the network construction changes and its fiber length changes due to expansion or the like, the delay time (the time which is required for signal reciprocation) must be again measured and the time must be set, so that it is troublesome. As a countermeasure, it is considered that the set time is set to a slightly large constant value. However, if a terminal apparatus which had received the transmission signal transmitted the signal by normally responding during such a set time, the repeater blocks the signal, because it is undesirable. Further, as a countermeasure for such a problem, there is also a method whereby the delay time is adjusted by adding an additional fiber, thereby preventing that the terminal apparatus that normally responds. However, according to the above methods in which the set time is set to a value which is larger than it is needed, since the delay time of the frame is unnecessarily set to a large value, there is a problem such that the response speed deteriorates.

SUMMARY OF THE INVENTION

It is, therefore, an object of the present invention to provide a signal transmission system in which even if an optical fiber length changes, it is particularly unnecessary to execute the adjusting work; a response speed of a signal is not lost, and the destruction and circulation of a frame does not occur.

The above object is accomplished by providing means of inhibiting the repeating of the frames in the opposite direction during the reception and the transmission of frames and monitoring the number of frames which were outputted in one direction from a repeater and the number of frames which were returned from such direction.

On the other hand, the above object is also accomplished by providing means for adding ID data to the frames which are outputted from a repeater and confirming that the frames with the ID data were returned.

Further, the above object is accomplished by providing means of automatically measuring a time until output data in one direction of a repeater is returned and setting such a time into a timer.

According to the present invention, if the repeating in the opposite direction is inhibited until the frames of only the number of frames which had been outputted from the repeater were returned from the star coupler, a circulation or destruction phenomenon of the frames can be prevented.

On the other hand, if ID data is added to each of the frames which are sent from the repeater and the repeating in the opposite direction is inhibited until it is confirmed that the frames with the ID data were returned, a circulation or destruction phenomenon of frames can be prevented.

Further, although the same timer as the conventional one is used, if its set time is set by the automatic measurement of the delay time of the optical fiber, a circulation or destruction phenomenon of frames can be also prevented.

In any of the above cases, the echo back inhibition control is automatically executed, there is no need to execute a troublesome setting operation, and the response speed does not deteriorate.

BRIEF DESCRIPTION OF THE DRAWINGS

FIG. 6a-6b is a diagram showing an example of frames added with ID data of a repeater;

DESCRIPTION OF THE PREFERRED EMBODIMENTS

Figure 2:
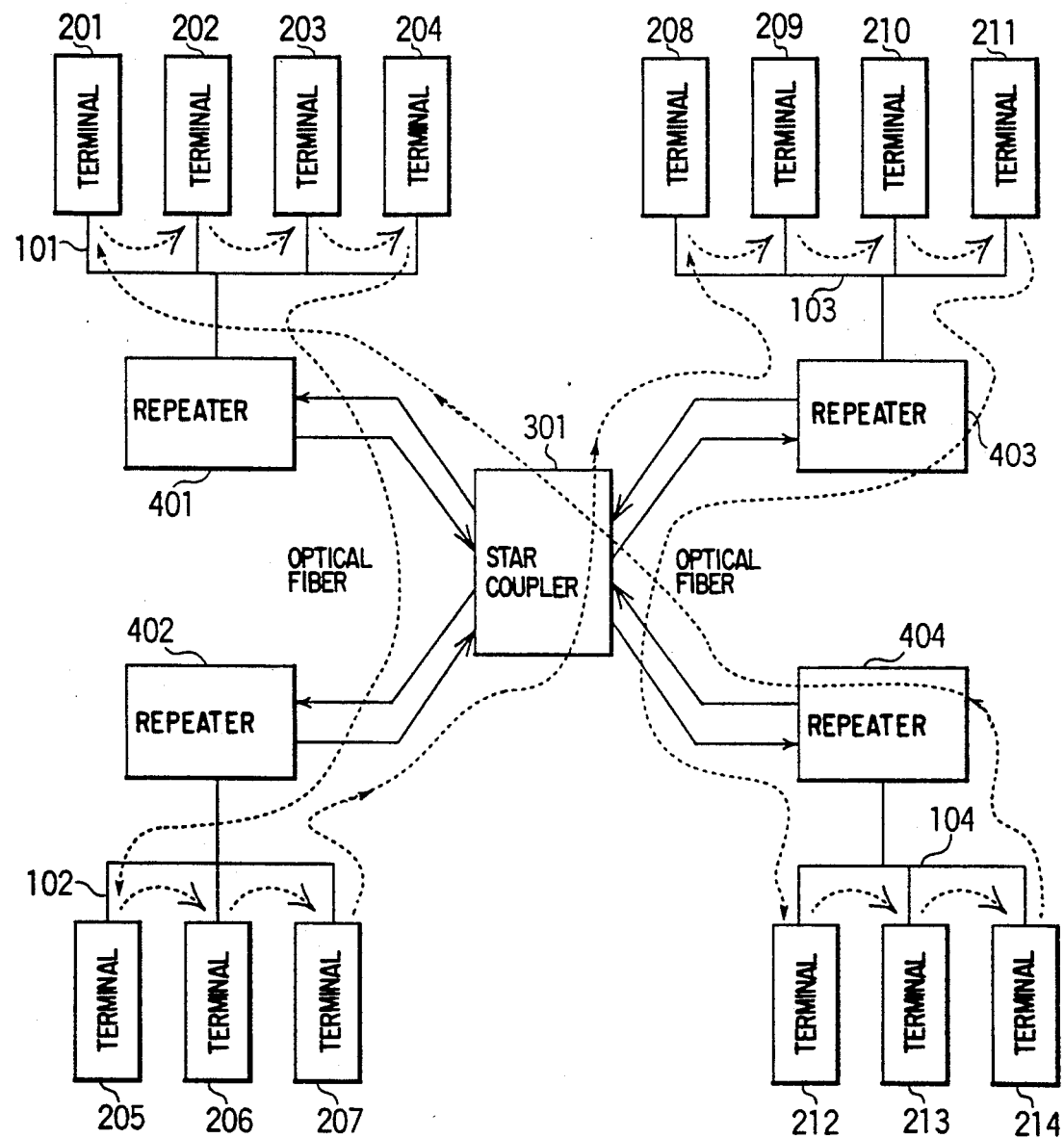
FIGS. 2 and 3 are block diagrams of a network using a signal transmission system to which the invention can be applied.
Figure 3:
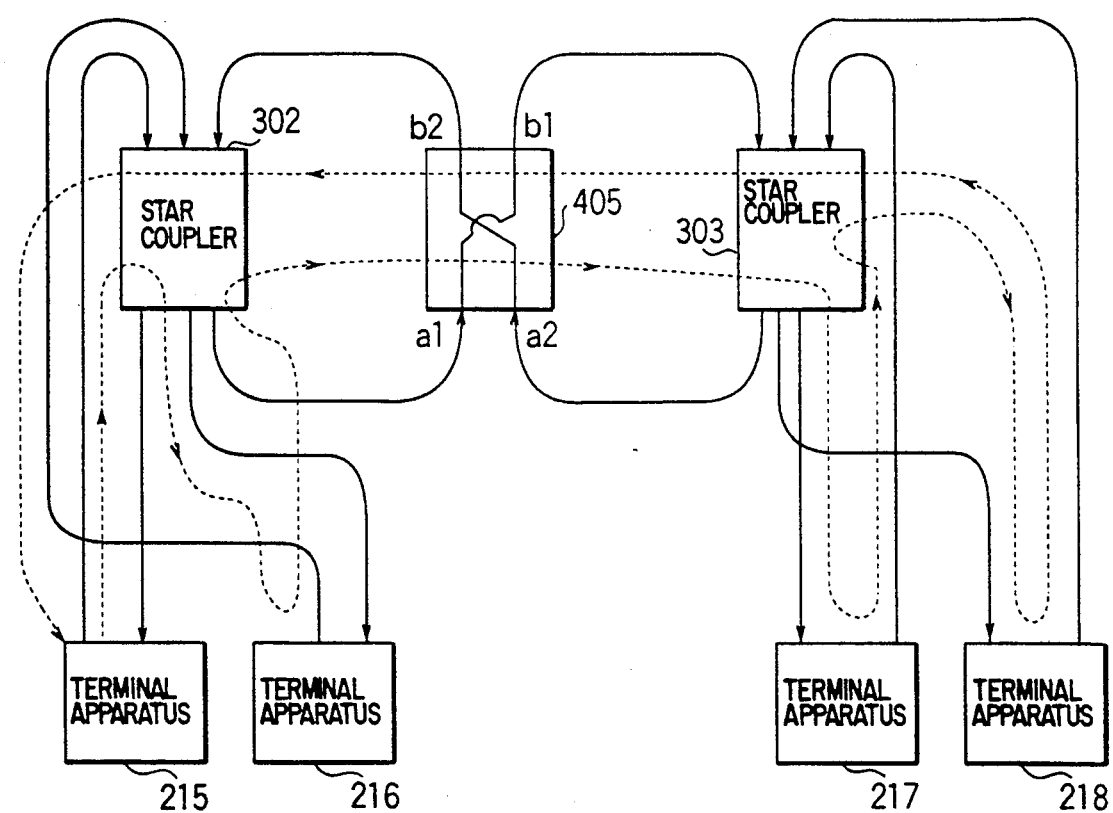

The present invention is applied to a transmission system as shown in FIG. 2 or 3.

FIG. 2 is a network system according to the former expanding method and shows an example of a system in which local networks by a plurality of coaxial cables are connected by a star coupler. In the system, terminal apparatuses 201 to 204, 205 to 207, 208 to 211, and 212 to 214 are respectively connected to four coaxial buses 101 to 104. Four sets of local networks constructed by the coaxial buses and terminal apparatuses are connected to repeater 401 to 404 through a star coupler 301 and construct a network system as a whole. According to the network system, for instance, when the terminal apparatus 201 transmits a signal, the signal is received by the other terminal apparatuses 202 to 204 in the local network through the coaxial bus 101. Further, the signal is received by the other terminal apparatuses 205 to 214 in the other local networks through the repeater 401, star coupler 301, and repeater 402 to 404, and a network system is constructed as a whole circuit of FIG. 2. As mentioned above, bidirectional communication paths among the local networks are realized by a simple construction by using the star coupler.

FIG. 3 is a network system according to the latter expanding method and shows an example of a system in which bidirectional paths among terminal apparatuses are formed by star couplers. In the system, terminal apparatuses 215 and 216 are connected by a star coupler 302; terminal apparatuses 217 and 218 are connected by a star coupler 303, and local networks are constructed, respectively. The two star couplers are connected through a repeater 405. All of the lines indicative of the connections are constructed by optical fibers.

As a signal transmission system in those network systems, there has been known a system in which each terminal apparatus detects that the transmission path is not used and transmits a signal and in which transmission rights (hereinafter, referred to as tokens) of signals are transferred in accordance with a predetermined order, and only the terminal apparatus having the token transmits the signal, and the like. However, the invention can be also applied to any of the above signal transmission systems. In FIGS. 2 and 3, broken lines indicate a transfer order of the tokens when the signal is transmitted by using the tokens.

Explanation will now be made hereinbelow in an example of a system of FIG. 3 with respect to a flow of frames (refer to FIGS. 3 and 4 (a) to g))). When the token passing transmission system is used, a construction is shown (refer to FIG. 1) of a repeater which is necessary to certainly execute the flow and functions (refer to the flow of the signal of each section in FIG. 4) of the repeater. In FIG. 3, for instance, as shown by broken lines in the diagram, the tokens as transmission rights are transferred through the terminal apparatuses 215, 216, 217, and 218 and are again transferred to the terminal apparatus 215. That is, for instance, the terminal apparatus 215 transmits a token frame (a signal frame indicative of the token) to designate the terminal apparatus 216 onto the transmission path. Only the terminal apparatus 216 among all of the terminal apparatuses which received the token frame designates a special terminal apparatus and transmits a data frame (a signal frame including data) onto the transmission path. Although all of the terminal apparatuses receive the data frame, only the designated special terminal apparatus fetches the data frame and uses for it for internal processes. After the data frame was transmitted, the terminal apparatus 216 transmits the token frame to designate the terminal apparatus 217 onto the transmission path. In a manner similar to the above, the signal transmission is executed in accordance with a predetermined order.

Figure 4:
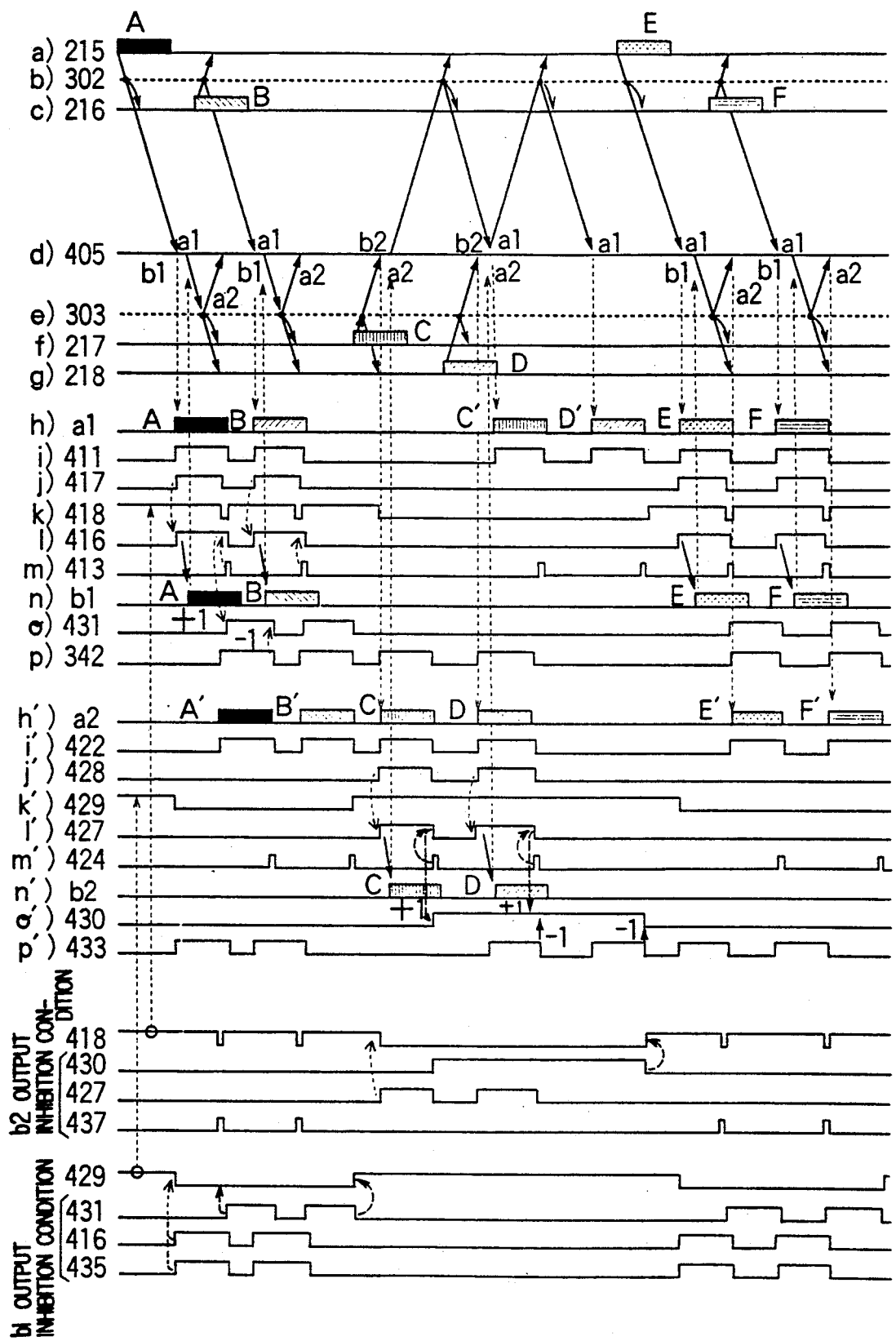
FIG. 4 is a diagram showing signals in each section of the embodiment of FIG. 1.

FIGS. 4 (a) to (g) show transfer states of frames A to F (in the diagrams, the token frame and the data frame are not distinguished and the signal frames from the terminals are set to A to F, respectively). As will be obvious from the diagrams, the frames are transferred through the repeater 405 and star couplers 302 and 303. However, in the flow of the frame transfer, since the star coupler distributes and outputs any input to all of the terminals, for instance, the frame A which was transferred from the terminal apparatus 215 to the star coupler 303 via the star coupler 302 and an output terminal $b_1$ of the repeater 405 is sent to not only the terminal apparatuses 217 and 218 but also an input terminal $a_2$ of the repeater 405 if no countermeasure is executed in the repeater 405. The frame A is transferred from output terminal $b_2$ to the star coupler 302. At this time, if a length of the frame which is transmitted from the terminal apparatus 215 is longer than a length of each signal path (optical fiber), and the frame from the terminal apparatus 215 is continuously input to the star coupler 302, it is synthesized with the frame which was returned from the repeater 405 in the star coupler 302 and the synthesized frame is sent to each output terminal, so that the frame is destroyed. On the other hand, when the frame length is so short as to cause no overlap in the star coupler, a loop-shaped path comprising the star coupler 302, repeater 405, and star coupler 302 is formed and the frame is circulated many times, so that there occurs an inconvenience such that a part of the frame is sent to the terminal apparatus each time the frame is circulated.

Figure 1:
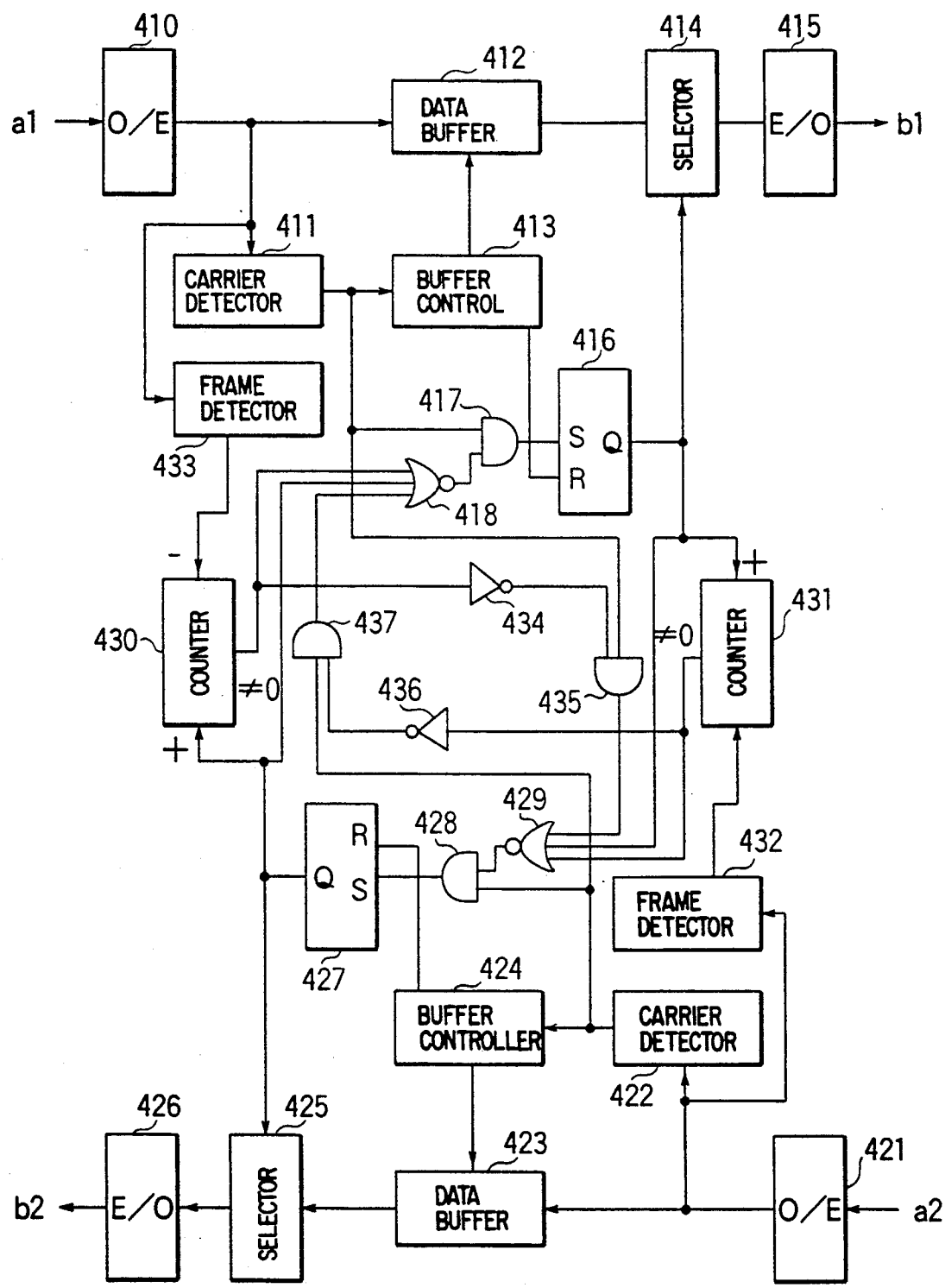
FIG. 1 is a block diagram of a repeater showing an embodiment of the present invention when repeating between star couplers.

FIG. 1 shows a construction of the repeater 405 when the embodiment of the invention in which such an inconvenience was improved is applied to FIG. 3. In the diagram, $a_1$ and $b_1$ denote an input terminal and an output terminal, of a photo signal when the signal is transmitted to the side of the star coupler 303. The signal transmission to the star coupler 303 is controlled by each of the circuits 410 to 418, 430, 433, 436, and 437. $a_2$ and $b_2$ denote the input terminal and output terminal of a photo signal when the signal is transmitted to the star coupler 302. The signal transmission to the star coupler 302 is controlled by each of the circuits 421 to 429, 431, 432, 434, and 435. The circuit groups for the signal transmission control in each of the directions have the same construction. Reference numerals 410 and 421 denote photoelectric converters; 415 and 426 indicate electric/photo converters; 412 and 423 denote data buffers to store signals which were converted into electric signals; 411 and 422 denote carrier detectors to detect carriers of the transmission signals; 413 and 424 denote buffer controllers to control the data buffers 412 and 423 when the carriers exist; 416 and 427 denote flip-flop circuits which are set by AND circuits 417 and 428 and are reset by outputs of the buffer controllers 413 and 424, respectively; 414 and 425 denote selectors to extract and transmit the contents stored in the data buffers 412 and 423 when the flip-flop circuits 416 and 427 are respectively set; 433 and 432 denote frame detectors to detect the frames in the transmission signals which were converted into the electric signals; and 430 and 431 denote counters. When the flip-flop circuits 427 and 416 are respectively reset by signals which are obtained from the buffer controllers 424 and 413 when one frame was repeated; "1" is added to count values of the counters 430 and 431. When the final portion of the frame is detected by the frame detectors 433 and 432, "1" is subtracted from the count value of the counters 430 and 431. Reference numerals 417 and 428 denote the AND circuits; 435 and 437 denote AND circuits; 434 and 436 denote NOT circuits; and 418 and 429 denote NOR circuits. Since the circuit for controlling the output to the output terminal $b_1$ and the circuit for controlling the output to the output terminal $b_2$ in FIG. 1 have the same construction, an example in which the signal is transmitted to the star coupler 303 side will now be described hereinbelow.

First, the case where an input signal to the input terminal $a_1$ is repeated and transferred to the output terminal $b_1$; this case will not be described with reference to FIG. 4. In the initial state in which no signal is input to the input terminals $a_1$ and $a_2$, all of the outputs of the sections excluding the NOT circuits 434 and 436 (since the signals thereof are inverted signals of output signals of the counters 430 and 431, the NOT circuits 434 and 436 are not shown) and the NOR circuits 418 and 429 are set to "0". In such an initial state, a photo signal A which was input from the star coupler 302 to the input terminal $a_1$ is converted into the electric signal by the photoelectric converter 410 and is input to the carrier detector 411 and data buffer 412. In this case, since the data repeating from another input terminal $a_2$ to the output terminal $b_2$ has not been executed, the circuit section to control the data repeating to the output terminal $b_2$ is held in the foregoing initial state. Outputs of the counter 430, flip-flop 427, and carrier detector 422 are all set to "0" and an output of the NOR circuit 418 is set to "1". Thus, when the carriers are detected by the carrier detector 411, the flip-flop 416 is set, and the frame in the data buffer 412 passes through the selector 414 and is converted into the photo signal by the electric/photo converter 415 and is sent to the star coupler 303 on the right side. The reading operation of the data from the data buffer 412 to the selector 414 at this time is controlled by the buffer controller 413. In a manner similar to the above, the input data to the input terminal $a_2$ is also repeated to the output terminal $b_2$. Since such an operation can be easily understood by the person with an ordinary skill in the art, its description is omitted here.

Explanation will now be made with respect to the case where echo back signals A' and B' from the star coupler 303 can be blocked in a state in which input data A and B of the input terminal $a_1$ were repeated from the output terminal $b_1$. Each time the input data A and B are detected by the carrier detector 411, its output is set to "1" and input to the NOR gate 429 through the AND circuit 435. On the other hand, the flip-flop 416 is set by the output "1" detected by the carrier detector 411 and its output "1" is also input to the NOR gate 429. When the flip-flop 416 is set, the frame in the data buffer 412 is repeated to the side of the terminal $b_1$. In response to the repeating, the buffer controller 413 resets the flip-flop 416, and "1" is added to the count value of the counter 431 in response to it. However, when the count value of the counter 431 is not set to "0", the counter 431 outputs a "1" signal. Thus, "1" is also input from the counter 431 to the NOR gate 429. When any one of the inputs is set to "1", the NOR gate 429 outputs a "0" signal. The relation between the input of each NOR gate 429 of the circuits 431, 416, and 435 and the output of the NOR gate 429 is shown as a $b_2$ output inhibition condition in the lowest position in FIG. 4. As shown in the diagram, the output of the NOR gate 429 is set to "0" for a period of time until the frames A' and B' are detected at the $a_2$ terminal after the frames A and B were detected at the $a_1$ terminal. Thus, an output of the AND circuit 428 is set to "0" irrespective of the other input (output of the carrier detector 422), so that the flip-flop 427 is not set. This means that when the repeating of the signal is started in either one of the bidirectional communication paths, the signal (this signal is considered to be an echo back signal) which was input to the other communication path is not repeated after that. Therefore, the repeating of the input data from the input terminal $a_2$ to the output terminal $b_2$ is inhibited for a period of time until the count value of the counter 431 is set to "0" after the output of the carrier detector 411 was set to "1" by the input signal to the input terminal $a_1$. The frames of the signal received at the terminal $a_2$ are detected by the frame detector 432 and "1" is subtracted from the count value of the counter 431. Therefore, the count value of the counter 431 is set to "0" when the frames of the same number as the number of frames which had been sent from the terminal $b_1$ were received at the terminal $b_2$. Thus, the echo back signals are completely blocked.

When the echo back signals of the same number as the number of signals which were transmitted are confirmed by the counter 431, its output is set to "0" and the circuit of FIG. 4 is returned to the initial state. Since the transmission of signals C and D from the terminal $b_2$ after that will be understood in a manner similar to the case of the transmission of the signals A and B from the terminal $b_1$, its description is omitted. Further, it will be also easily understood from the above description that echo back signals C' and D' from the star coupler 302 of the signals C and D are blocked.

An idea of the control of the counters 430 and 431 will now be described. First, a format of a frame signal which is transmitted is ordinarily fixed in accordance with the transmission system. FIG. 6 shows a frame construction when the token passing system is used. (a) shows a token frame. (b) shows a data frame. In the diagram, PN is particularly added in another embodiment, which will be explained hereinlater and is not used in the description here. In FIG. 6, PA denotes a preamble; SD indicates a start delimiter; FC a frame control; DA destination address; SA a source address; DATA information; FCS a frame check sequence; and ED an end delimiter. The preamble denotes a synchronization flag of a frame; SD indicates a head flag of a frame; FC indicates an identifier to discriminate whether the frame is a token frame or a data frame; DA indicates the destination address; SA indicates the source address; DATA indicates the data which is sent on an octet unit basis; FCS the frame check sequence of an area from the frame identifier FC to the position just before the FCS; and ED indicates a flag indicative of the end of frame.

Figure 9:
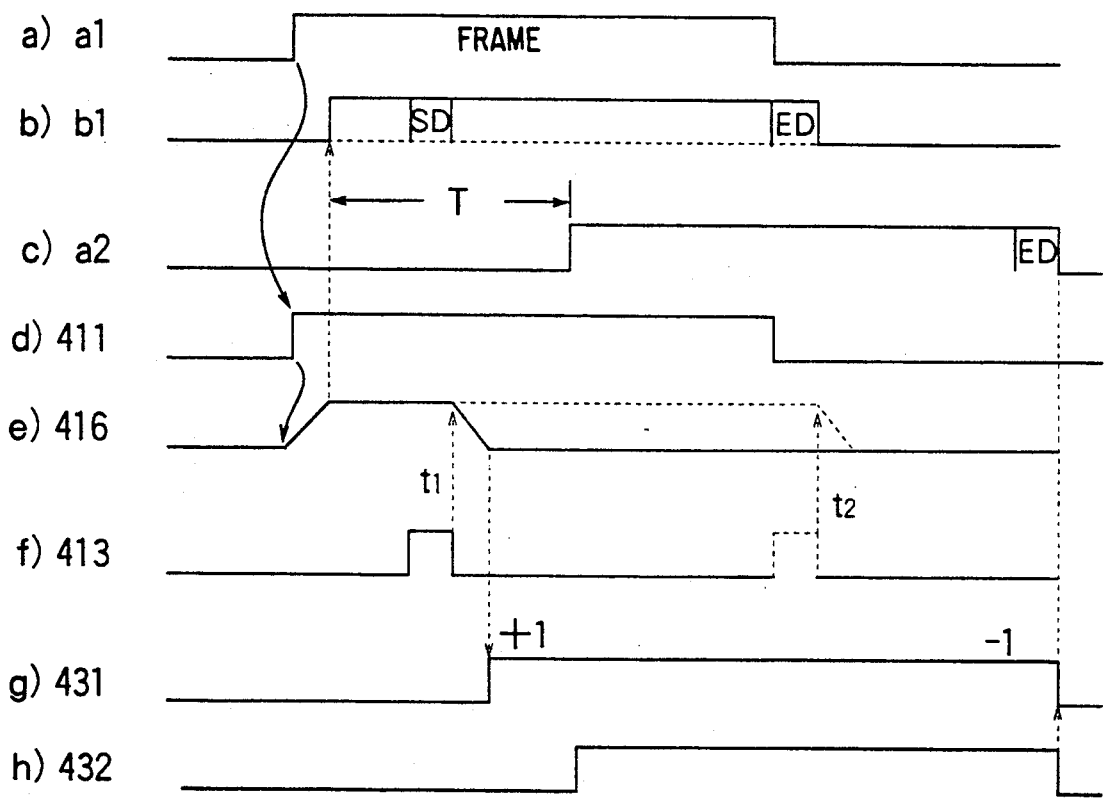
FIG. 9 is an diagram of the operation of a counter of the repeater.

FIG. 9 shows an example of the counter control. First, when frames are input to the input terminal $a_1$, the carrier detector 411 detects them and sets the flip-flop 416. When the flip-flop 416 is set, the transmission of the frames from the output terminal $b_1$ is started. However, a slight time deviation occurs between the transmission frame and the reception frame. The buffer controller 413 detects the repeating of the transmission frame and outputs. The outputting timing is set to either a transmission end time $t_2$ of all of the frames or a proper time (for instance, a time when the start delimiter SD was detected as a characteristic portion of the frame) $t_1$ in the transmission frame. In the example shown in the diagram, it is detected at time $t_1$. "1" is added to the count value of the counter 431 by such a detection signal. On the other hand, the return frame is received by the terminal $a_2$ after the elapse of time T from the frame transmission. In the frame detector 432, the end delimiter ED of the frame is detected, and "1" is subtracted from the count value of the counter 431. Therefore, since all of the frames are not returned yet until the count value is set to "0", the signal transmission to the $b_2$ terminal is blocked. The above concept is eventually based on that it is confirmed that the frames of the same number of the number of frames which had been transmitted were returned. In the embodiment of FIG. 1, the frame detectors 433 and 432 can be detected by various forms. As shown in FIG. 9, a system is shown in which a feature of the frame is detected and used for the frame detection; a system in which the carriers included in the frame itself are captured and used for the frame detection, or the like can be used. On the other hand, the count value is set to an integer of 0 or more and even if the count-down is continued, the count value is not set to a minus value.

As mentioned above, according to the invention, each time one frame is repeated, the flip-flop 416 is reset by the buffer controller 413 and the value of the counter 431 is increased by "+1". Each time the frame is input from the input terminal $a_2$, the end time point is detected by the frame detector 432 and "1" is subtracted from the count value of the counter 431. Therefore, after the frames were sent from the input terminal $a_1$ to the output terminal $b_1$, and until all of them are returned to the input terminal $a_2$ via the star coupler, the value of the counter 431 is not set to "0". An output "1" at this time is input to the NOR gate 429, thereby blocking a circulation phenomenon of a short frame. At the same time, for the interval when the output from the counter 431 is set to "1", an output of the NOT circuit 436 is set to "0", so that it is prevented that the flip-flop 416 cannot be set when the frames were subsequently input from the input terminal $a_1$. That is, it is prevented by the NOT circuit 436 and AND circuit 437 that some signal is input from the input terminal $a_2$ and the output "1" of the carrier detector 422 is directly input to the NOR gate 418.

A modification of the invention shown in FIG. 1 will now be described. According to the system, a timer function in which a time which is larger than the maximum time which is presumed as a time for the frame to be returned after it was transmitted is set is provided for the counters 430 and 431 in FIG. 1. If no frame is returned even after the elapse of such a set time, the counter is reset. With such a timer function, it is possible to recover the unrepeatable state as in the case where the frames are destroyed because the frames are simultaneously sent from a plurality of terminal apparatuses to the star coupler, where the frames are lost by some abnormality and are not returned, or where the repeatings in both directions are inhibited because the frames were simultaneously input to both input terminals $a_1$ and $a_2$ upon rising of the system. According to the system, even if an optical fiber length changes, the echo back inhibition control can be executed without needing any special work.

Figure 5:
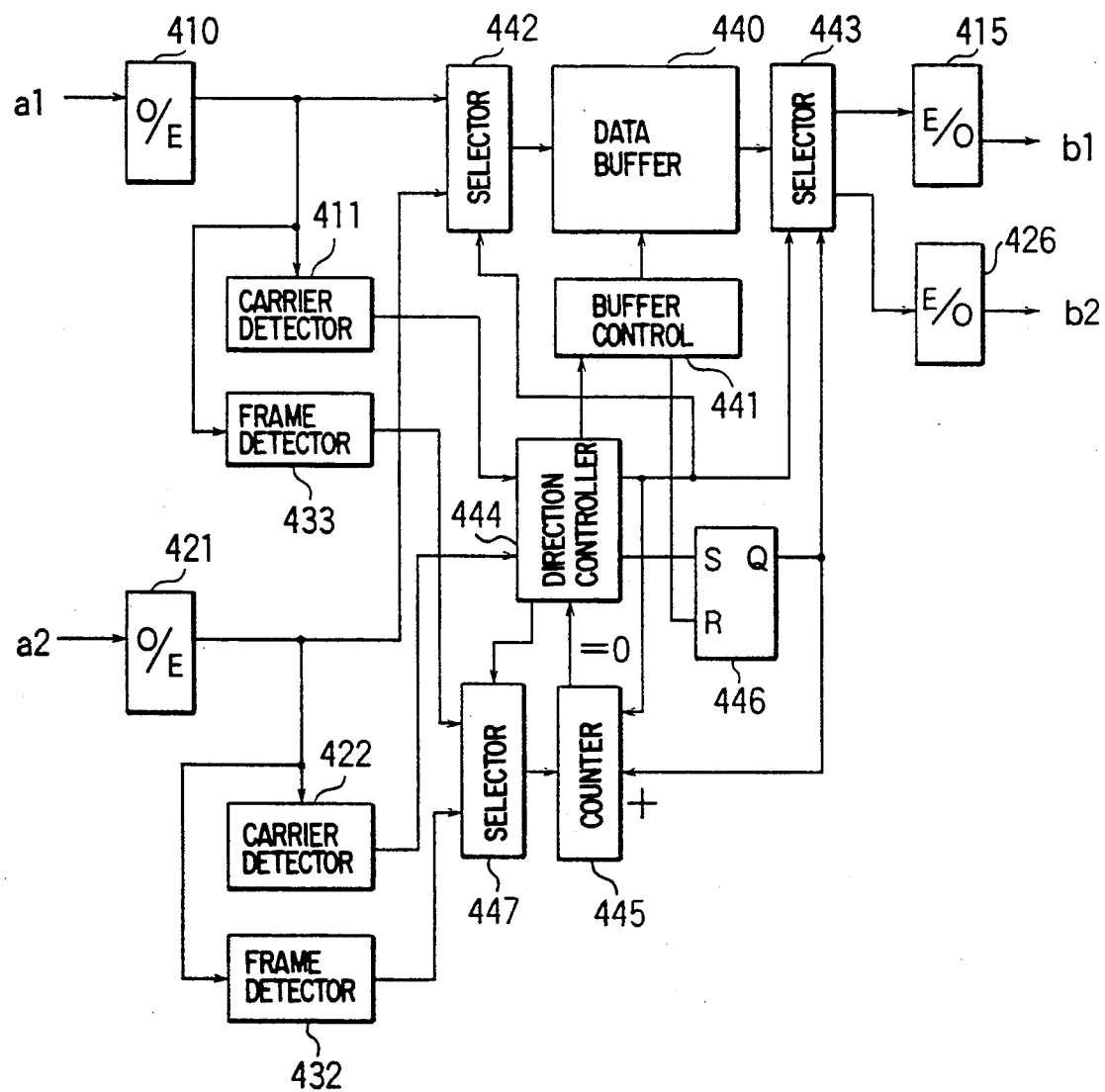
FIG. 5 is a block diagram showing a modification of the embodiment of FIG. 1.

FIG. 5 shows another modification of the invention of FIG. 1. In the embodiment of FIG. 1, the two data buffers 412 and 413 are not simultaneously used. In particular, like a token passing system, there is a system in which a transmission order has been predetermined and it is inherently impossible that a plurality of terminal apparatuses can simultaneously transmit. In such a case, the embodiment of FIG. 5 in suitable. According to such a system, one data buffer 440 is used and is made operative by switching the using direction, and the portions regarding the data buffer is also constructed as a single circuit, thereby simplifying the apparatus. A buffer controller 441, a flip-flop 446, a counter 445, and a selector 443 are combined as a single circuit. A direction controller 444 (including the functions of the gates 417, 418, 428, 429, and 434 to 437 in FIG. 1 as well) and selectors 442 and 447 are newly added. The connecting position and function of the selector 443 were changed.

In the above construction, the direction controller 444 controls so as to execute the repeating of the carrier detector which first detects the input of either the carrier detectors 411 and 422. For instance, when the input of the input terminal $a_1$ is first detected, the frame from the photoelectric converter 410 is set into the data buffer 440 by the selector 442. The frame is output from the selector 443 to the output terminal $b_1$ via the electric/photo converter 415. At this time, "1" is added to the count value of the counter 445 each time the frame repeating is executed by an output of the flip-flop 446. "1" is subtracted from the count value of the counter 445 by an output (which is output at the trailing edge each time one frame is returned to the input terminal $a_2$) of the frame detector 432 selected by the selector 447 under the control of the direction controller 444. As mentioned above, the frame which was repeated and is not yet returned is monitored and the repeating from the input terminal $a_2$ to the output terminal $b_2$ is inhibited by the selector 442 for the interval until the value of the counter 445 is set to "0", thereby executing the echo back inhibition control. When the value of the counter 445 is set to "0", the direction controller 444 is reset and the monitor of the next input frame is started.

According to the embodiment, the same operation as that of the embodiment of FIG. 1 is executed, the number of circuits which are used is reduced, and the repeating apparatus can be miniaturized.

Figure 8:
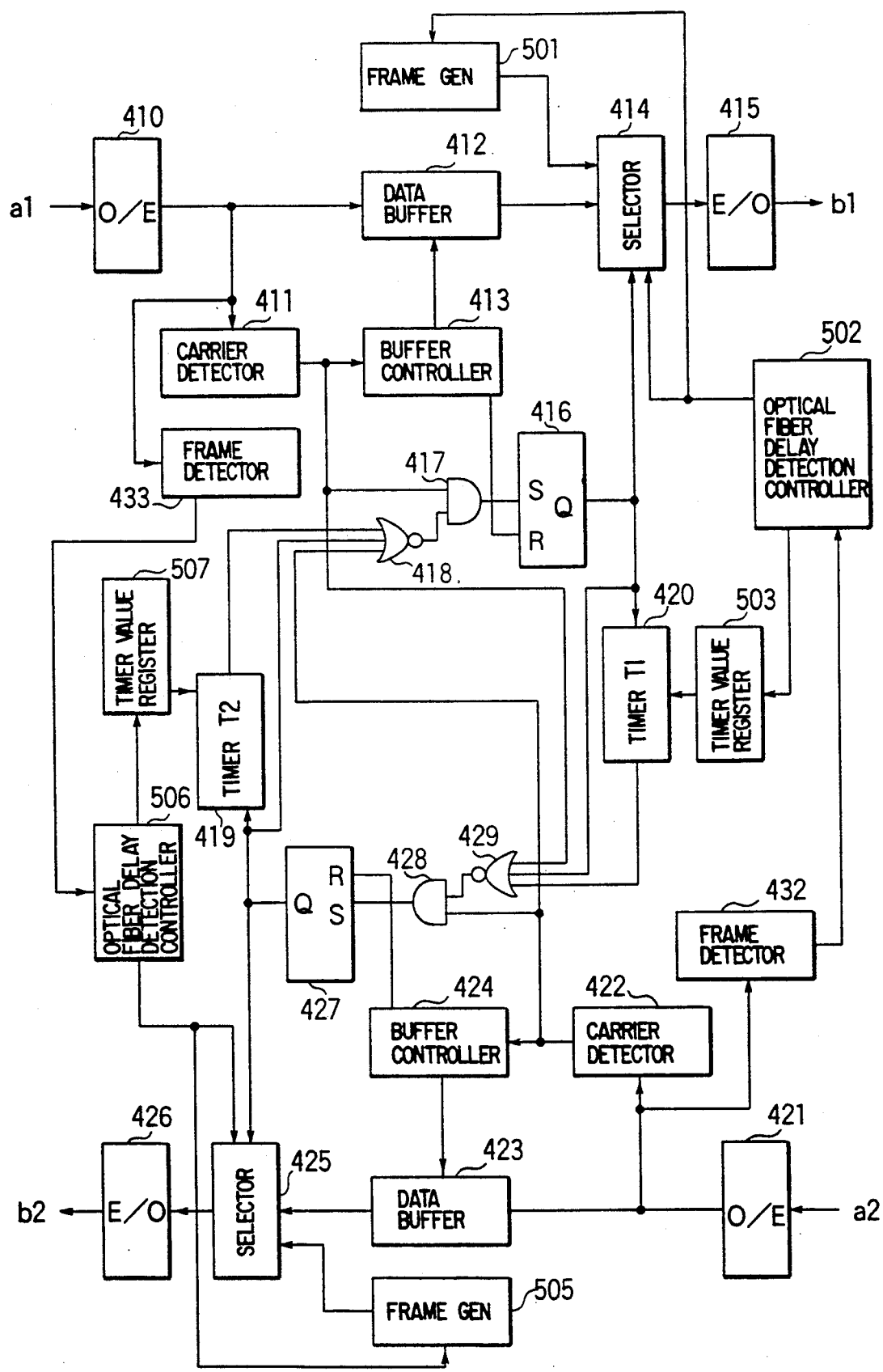
FIG. 8 is a diagram showing another embodiment of the invention.

Another embodiment of the invention is shown in FIG. 8. In the diagram, the repeater has peculiar ID data. By adding the ID data to the frame which was repeated, it is discriminated whether the frame transmitted from the star coupler is the frame which has been repeated at present or a frame from other repeater terminal apparatus, thereby executing the echo back inhibition control.

FIG. 6 shows an example of a frame format of the token bus system which is used in the embodiment. (a) shows a token frame. (b) shows a data frame. The meanings of each section of the frame are as mentioned above. Although the above construction has an ordinary frame format, according to the embodiment, the frame format is not changed, but as ID data which is peculiar to the repeater, a pass number PN is added to the trailing edge of each frame. On the other hand, if there are a plurality of repeaters, pass numbers PN of different values for the repeaters are added to the trailing edge of each frame. With such pass numbers PN, it is possible to discriminate whether the frame sent from the star coupler is a frame which had been repeated by the repeater itself and was returned or a frame which was transferred from other repeater. By controlling in a manner such that the frame which was repeated by the repeater itself is not sent in the opposite direction (since a circuit construction to execute such a control can be easily realized, it is not shown), the echo back inhibition control can be executed. Moreover, such a control does not cause a problem such that it is necessary to set the timer time in accordance with the length of optical fiber.

In FIG. 6, the inserting position of the pass number PN has been set to a position after the end delimiter flag ED. However, it can be also added before the start delimiter flag SD. However, in this case, during the discrimination of the frame, the frame is stored into the data buffer to hold the frames in the repeater, and upon repeating, the data is transmitted, and when ignoring, the data is erased.

As a modification of the embodiment in which ID data which is peculiar to the repeater is provided, there has been known a method whereby after a power source of the repeater was turned on, the frame having the pass number PN is transmitted to the star coupler and the delay time which is required until the frame is returned from the star coupler is measured. In this case, the reception frame is held in the buffer in the repeater for the interval when the delay time is measured. When it is detected that the frame having the pass number PN which is peculiar to the repeater was returned, the frame in the buffer is erased and the delay time detected is set into a timer for a delay time measurement (which is provided as shown in FIG. 4). When the next frame is repeated, in a manner similar to the conventional method, it is sufficient to execute the echo back inhibiting operation so as not to repeat the reception frame in a manner such that no echo back occurs for the period of time until the end delimiter flag ED is transmitted after completion of the transmission of the preamble of the frame and for the period of time from the completion of the transmission of the end delimiter flag ED until the end of the delay time timer.

FIG. 8 differs from the circuit of FIG. 1 with respect to a first point that timers 419 and 420 are used in place of the counters 430 and 431 and the NOT circuits 434 and 436 and AND circuits 435 and 437 are eliminated and a second point that in order to measure the return time, optical fiber delay detection controllers 502 and 506, frame generators 501 and 505, and timer value registers 503 and 507 to determine the times of the timers 419 and 420 are added. With the above circuit, the frame generators 501 and 505 are activated from the optical fiber delay detection controllers 502 and 506, the pass number PN which is peculiar to the relevant repeater is added, and the frames are transmitted from the output terminals $b_1$ and $b_2$ to the star coupler through the selectors 414 and 425. The controllers 502 and 506 measure the delay times by measuring the time until the pa number PN which is peculiar to the repeater is returned from the frame detectors 432 and 433, set the measured delay times into the timer value registers 503 and 507 and determine the times of the timers 420 and 419.

According to the above modification, the times of the timers can be automatically set in accordance with the length of optical fiber and the maintenance and operation of the repeater are simplified. The timing for measuring the delay time is not limited to only the time point after the turn-on of the power source but if the delay time is periodically measured, it is also possible to cope with the case where the optical fiber is extended.

Even in the above repeater for executing the echo back inhibition control by using the pass number, in a manner similar to the case where the numbers of frames which are input and output are counted by the counters, as a countermeasure for a situation such that the frames are destroyed or the like because of the frame transmission from a plurality of terminal apparatuses or an abnormality, it is sufficient to construct in a manner such that there is provided a timer into which a time larger than the presumed maximum delay time was set and the echo back inhibition control is not executed for a time period exceeding such a time.

Figure 7:
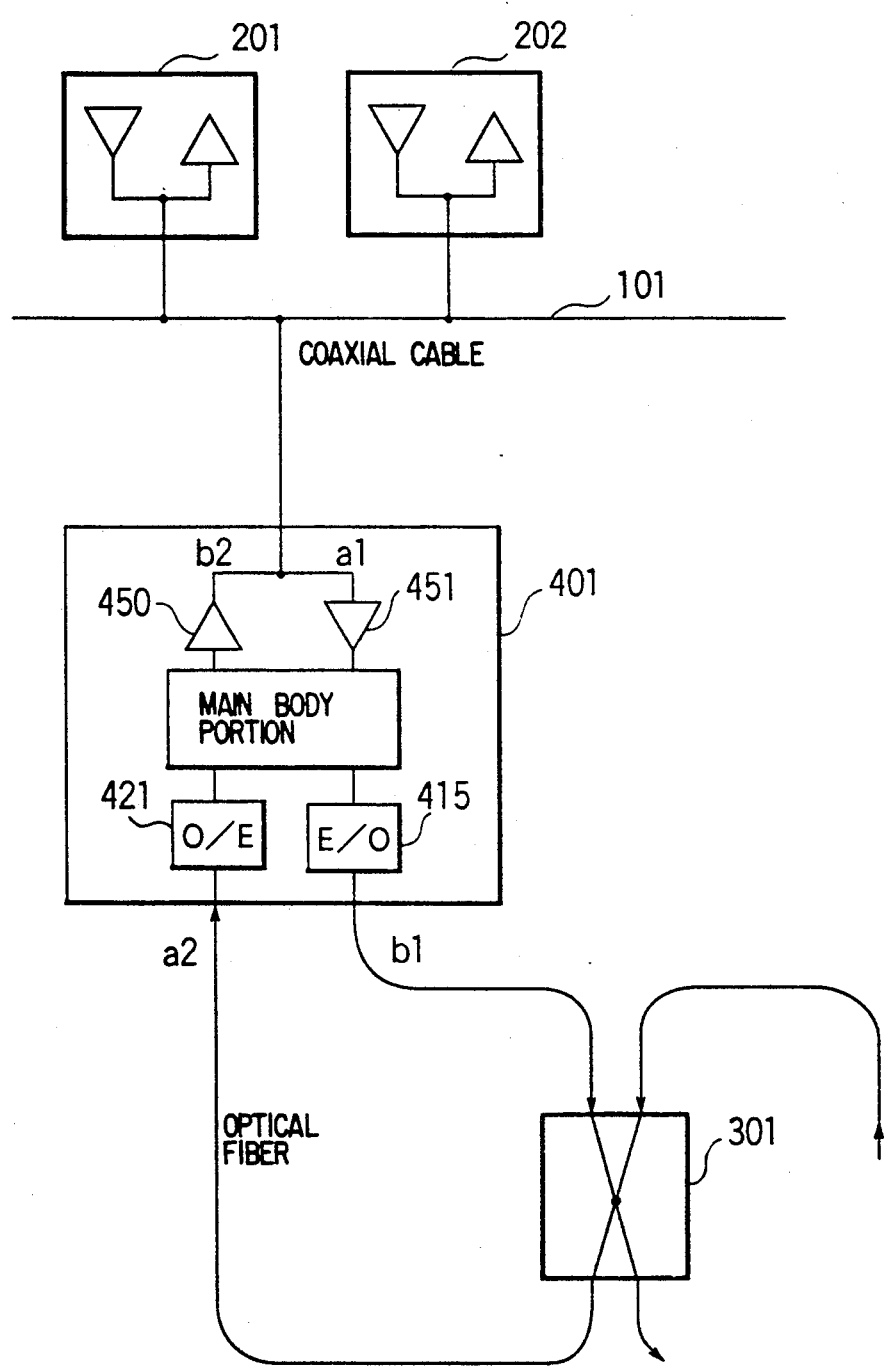
FIG. 7 is an diagram of the repeater when repeating a star coupler and a coaxial cable bus.

Further, although all of the foregoing embodiments have been described with respect to the repeater for executing the repeating of two star couplers, as shown in FIG. 2, the invention can be also applied to the case of a repeater for repeating between the star coupler and the coaxial cable bus. In such a case, when explaining the repeater 401 of FIG. 2 as an example, in the embodiment of FIG. 1 or 5, as shown in FIG. 7, the photoelectric converter 410 and electric/phone converter 426 which are connected to the input terminal $a_1$ and output terminal $b_2$ on the side of the coaxial cable bus 101 are replaced to a receiver 451 and a transmission driver 450, while the main body section (section excluding the converters 410, 415, 421, and 426 in FIGS. 1 and 5) of the repeater, the photoelectric converter 421, and the electric/photo converter 415 are constructed substantially in the same manner as that in FIG. 1 or 5.

According to the invention, since the manual works such as to measure and set the time to execute the echo back inhibition control in accordance with the length of optical fiber become unnecessary, the maintenance and operation of the repeater can be efficiently executed and the flexibility of the network construction can be improved. In addition, since there is no need to unnecessarily extend the optical fiber length, there is an advantage such that a deterioration of a communication efficiency due to the execution of the echo back inhibition control does not occur.

We claim:

1. A star coupled repeater comprising at least two signal input terminals and at least two signal output terminals, for repeating a frame signal by receiving said frame signal at one input terminal of said at least two signal input terminals, transmitting said frame signal from one output terminal of said at least two signal output terminals, receiving said transmitted frame signal being returned at another input terminal of said at least two signal input terminals and transmitting said returned frame signal from another output terminal of said at least two output terminals, comprising:

monitoring means for obtaining delay information indicative of a delay from a transmission of said frame signal from said one output terminal to a first reception of said frame signal transmitted from said one output terminal at said other input terminal, comprising:

a first frame detector for detecting a second reception of said signal by detecting said trailing edge of said frame signal received at said one input terminal of said at least two signal input terminals;

a second frame detector for detecting a third reception of said signal by detecting said trailing edge of said frame signal received at said other input terminal of said at least two input terminals; and counting means for counting up at a first detection of said second reception of said signal by said first frame detector and for counting down at a second detection of said third reception of said signal by said second frame detector; and means for controlling a transmission of said signal from said other output terminal of said at least two signal output terminals corresponding to said delay information from said monitoring means, wherein, said counting means are maintained at a first predetermined value before a predetermined frame signal is received, and after said predetermined frame signal is received and transmitted, said frame signal being received at said other input terminal of at least two signal input terminals is not transmitted from said other output terminal until said counting means becomes said first predetermined value.

2. A star coupled repeater comprising at least two signal input terminals and at least two signal output terminals, for repeating a frame signal by receiving said frame signal at one input terminal of said at least two signal input terminals, transmitting said frame signal from one output terminal of said at least two signal output terminals, receiving said transmitted frame signal being returned at another input terminal of said at least two signal input terminals and transmitting said returned frame signal from another output terminal of said at least two signal output terminals, comprising:

monitoring means for obtaining delay information indicative of a delay from a transmission of said frame signal from said one output terminal of said at least two signal output terminals to a first reception of said frame signal at said other output terminal of said at least two signal input terminals, comprising:

a first frame detector for detecting a second reception of a signal by detecting a trailing edge of said frame signal received at said one input terminal of said at least two signal input terminals;

a second frame detector for detecting a third reception of said signal by detecting said trailing edge of said frame signal received at said other input terminal of said at least two signal input terminals; and counting means for counting up at a first detection of said second reception of said signal by said first frame detector and for counting down at a second detection of said third reception of said signal by said second frame detector;

means for controlling a transmission of said signal from said other output terminal corresponding to said delay information from said monitoring means; and means for inhibiting a repetition of said frame signal received at said other input terminal of said at least two input terminals, and wherein, said counting means are maintained at a predetermined value before a predetermined frame signal is received, and after said predetermined frame signal is received and transmitted, and for activating said inhibiting means when said counting means is not at said predetermined value.

3. A star coupled repeater comprising at least two signal input terminals and at least two signal output terminals, for repeating a predetermined frame signal by receiving said predetermined frame signal at one input terminal of said at least two signal input terminals, transmitting said predetermined frame signal from one output terminal of said at least two signal output terminals, receiving said transmitted predetermined frame signal being returned at another input terminal of said at least two signal input terminals and transmitting said returned predetermined frame signal from another output terminal of said at least two signal output terminals, comprising:

means for detecting a delay period from a transmission of said predetermined frame signal to a reception of said predetermined frame signal and generating an output signal; and means for inhibiting a transmission of a signal from said other output terminal of said at least two signal output signal terminal for said delay period corresponding to said output signal from said detecting means;

means for switching over a data buffer in accordance with a repeating direction.

4. A star coupled repeater comprising:

at least two signal input terminals;

at least two signal output terminals;

data adding means for adding ID data of the star coupled repeater to a frame signal received at one input terminal of said at least two signal input terminals and for transmitting said frame signal; and means for inhibiting a repetition of said frame signal received at an opposite input terminal of said at least two signal input terminals for a period from a transmission of said frame signal having said ID data to a first reception of said frame signal having said ID data at said opposite input terminal, said inhibiting means being provided in each repeating direction of said star coupled repeater.

5. A star coupled repeater according to claim 4, further comprising:

means for generating a specified frame signal having said ID data of the star coupled repeater;

means for measuring a delay time from a transmission of a frame signal transmitted from said data adding means or from said generating means to a second reception of said frame signal transmitted from said data adding means or from said generating means at said opposite input terminal;

timer means for setting said delay time measured by said measuring means; and means for inhibiting the repetition of said frame signal received at said opposite input terminal until said delay time set by said timer means elapses from when an inputted frame signal at said one input terminal has been transmitted, said inhibiting means being provided in each repeating direction of said star coupled together.

6. A star coupled repeater according to claim 4, wherein said inhibiting means inhibits the repetition of an inputted frame signal to said opposite input terminal while said frame signal is being inputted to said one input terminal or said inputted frame signal from said one input terminal is being transmitted.

7. A star coupled repeater according to claim 4, wherein said inhibiting means comprises means for activating said inhibiting means in at least one of said repeating directions.

8. A star coupled repeater according to claim 4, further comprising monitoring means for obtaining delay information corresponding to a delay from a transmission of said frame signal from said one output terminal to a reception of said frame signal transmitted from said one output terminal at said opposite input terminal.

9. A signal transmission system comprising: a local network; an optical star coupler and a repeater provided between the local network and the optical star coupler, for executing a bidirectional communication, wherein said repeater comprises at least two signal input terminals and at least two signal output terminals and wherein said repeater repeats a frame signal by receiving said frame signal at one input terminal of said at least two signal input terminals, transmitting said frame signal from one output terminal of said at least tow signal output terminals, receiving said transmitted frame signal returned at another input terminal of said at least two signal input terminals and transmitting said returned frame signal from another output terminal of said at least two signal output terminals, and wherein said repeater further comprises:

monitoring means for obtaining delay information corresponding to a delay from a transmission of said frame signal from said one output terminal to a reception of said frame signal transmitted from said one output terminal at said other input terminal, said monitoring means comprising:

a first frame detector for detecting a first reception of a signal by detecting a trailing edge of said frame signal received at said one input terminal;

a second frame detector for detecting a second reception of said signal by detecting said trailing edge of said frame signal received at said other input terminal; and counting means for counting up at a first detection of said first reception at said first frame detector and for counting down at a second detection of said second reception at said second frame detector; and means for controlling a transmission of a signal from said other output terminal indicative of said delay information from said monitoring means, wherein, said counting means are maintained at a first predetermined value before a predetermined frame signal is received, and once said predetermined frame signal is received and transmitted, said frame signal received at said other input terminal is not transmitted from said other output terminal until said counting means becomes said first predetermined value.

10. A signal transmission system comprising: a local network; an optical star coupler; and a repeater provided between the local network and the optical star coupler for executing bidirectional communication, wherein said repeater comprises at least two signal input terminals and at least two signal output terminals, said repeater repeating a frame signal by receiving said frame signal at one input terminal of said at least two signal input terminals, transmitting said frame signal from one output terminal of said at least two signal output terminals, receiving said transmitted frame signal returned at another input terminal of said at least two signal input terminals and transmitting said returned frame signal from another output terminal of said at least two signal output terminals, and wherein said repeater further comprises:

monitoring means for obtaining delay information indicative of a delay from a transmission of said frame signal from said one output terminal to a reception of said frame signal at said other input terminal, said monitoring means comprising:

a first frame detector for detecting a second reception of a signal by detecting a trailing edge of said frame signal received at said one input terminal;

a second frame detector for detecting a third reception of said signal by detecting said trailing edge of said frame signal received at said other input terminal; and counting means for counting up at a first detection of said second reception at said signal at said first framed detector and for counting down at a second detection of said second reception of said signal at said second frame detector;

means for controlling a transmission of said signal from said other output terminal corresponding to said delay information from said monitoring means; and means for inhibiting a repetition of said frame signal received at said other input terminal, and wherein, said counting means are maintained at a predetermined value before a predetermined frame signal is received, and once said predetermined frame signal is received and transmitted, activating said inhibiting means when said counting means is not said predetermined value.

11. A signal transmission system comprising: a local network; an optical star coupler; and a repeater provided between the local network and the optical star coupler, said signal transmission system executing a bidirectional communication, wherein said repeater comprises at least two signal input terminals and at least two signal output terminals, said repeater repeating a frame signal by receiving said frame signal at one input terminal of said two signal input terminals, transmitting said frame signal from one output terminal of said two signal output terminals, receiving said transmitted frame signal returned at another input terminal and transmitting said returned frame signal from another output terminal of said at least two signal output terminals, and wherein said repeater further comprises:

means for detecting a delay period from a transmission to a reception of said frame signal and generating an output signal; and means for inhibiting a transmission of a signal from said other output terminal during said delay period indicative of said output signal from said detecting means.

12. A signal transmission system comprising: a local network; an optical star coupler; and a repeater between the local network and the optical star coupler, said repeater executing a bidirectional communication, wherein said repeater comprises:

at least two signal input terminals;

at least two signal output terminals;

data adding means for adding ID data of the repeater to a frame signal received at one input terminal of said at least two signal input terminals and for transmitting said frame signal; and means for inhibiting a repetition of said frame signal received at an opposite input terminal of said at least two signal input terminals for a period from a transmission of said frame signal having said ID data to said reception of said transmitted frame signal having said ID data at said opposite input terminal, said inhibiting means being provided in each repeating direction of said repeater.

13. A signal transmission system comprising: a first local network including a first optical star coupler and a first plurality of terminal apparatuses coupled by said first optical star coupler; a second local network including a second optical star coupler and a second plurality of terminal apparatuses coupled by said second optical star coupler; and a repeater provided between the first optical star coupler and said second optical star coupler for executing a bidirectional communication, wherein said repeater comprises at least two signal input terminals and at least two signal output terminals, said repeater repeating a frame signal by receiving said frame signal at one input terminal of said at least two signal input terminals, transmitting said frame signal from one output terminal of said at least two signal output terminals and transmitting said returned frame signal from another output terminal of said at least two signal output terminals, and wherein said repeater further comprises:

monitoring means for obtaining delay information indicative of a delay from a transmission of said frame signal from said one output terminal to a first reception of said frame signal transmitted from said one output terminal at said other input terminal, said monitoring means, comprising:

a first frame detector for detecting a second reception of a signal by detecting a trailing edge of said frame signal received at said one input terminal;

a second frame detector for detecting a third reception of said signal by detecting said trailing edge of said frame signal received at said other input terminal; and counting means for counting up at a first detection of said second reception at said signal at said first frame detector and for counting down at a second detection of said third reception at said second frame detector; and means for controlling a transmission of said signal from said other output terminal indicative of said delay information from said monitoring means, and wherein, said counting means is maintained at a predetermined value before a predetermined frame signal is received, and once said predetermined frame signal is received and transmitted, said frame signal received at said other input terminal is not transmitted from said another output terminal until said counting means become said predetermined value.

14. A signal transmission system comprising: a first local network including a first optical star coupler and a first plurality of terminal apparatuses coupled by said first optical star coupler; a second local network including a second optical star coupler and a second plurality of terminal apparatuses coupled by said second optical star coupler; and a repeater provided between the first optical star coupler and said second optical star coupler for executing bidirectional communication, wherein said repeater comprises at least two signal input terminals and at least two signal output terminals, said repeater repeating a frame signal by receiving said frame signal at one input terminal of said at least two signal input terminals, transmitting said frame signal from one output terminal of said at least two output terminals and receiving said transmitted frame signal returned at another input terminal of said at least two signal input terminals and transmitting said returned frame signal from another output terminal of said at least two signal output terminals, and wherein said repeater further comprises:

monitoring means for obtaining delay information indicative of a delay from a transmission of said frame signal from said one output terminal to a first reception of said frame signal at said other input terminal, said monitoring means comprising:

a first frame detector for detecting a second reception of a signal by detecting a trailing edge of said frame signal received at said one input terminal;

a second frame detector for detecting a third reception of said signal by detecting said trailing edge of said frame signal received at said other input terminal; and counting means for counting up at a first detection of said second reception of said signal at said first frame detector and for counting down at a second detection of said second reception of said signal at said second frame detector;

means for controlling a transmission of said signal from said other output terminal indicative of said delay information from said monitoring means; and means for inhibiting a repetition of said frame signal received at said other input terminal, wherein, said counting means are maintained at a predetermined value before a predetermined frame signal is received, and once said predetermined frame signal is received and transmitted, activating said inhibiting when said first predetermined value is not, said first predetermined value.

15. A signal transmission system comprising: a first local network including a first optical star coupler and a first plurality of terminal apparatuses coupled by said first optical star coupler; a second local network including a second optical star coupler and a second plurality of terminal apparatuses coupled by said second optical star coupler; and a repeater provided between the first optical star coupler and said second optical star coupler for executing bidirectional communication, wherein said repeater comprises at least two signal input terminals and at least two signal output terminals, said repeater repeating a frame signal by receiving said frame signal at one input terminal of said at least two signal input terminals, transmitting said frame signal from one output terminal of said at least two signal output terminals, receiving said transmitted frame signal returned at another input terminal of said at least two signal input terminals and transmitting said returned frame signal from another output terminal of said at least two signal output terminals, and wherein said repeater further comprises:

means for detecting a delay period from a transmission to a first reception of said frame signal and for generating an output signal; and means for inhibiting a transmission of a signal from said other output terminal for said delay period indicative of said output signal from said detecting means.

16. A signal transmission system comprising: a first local network including a first optical star coupler and a first plurality of terminal apparatuses coupled by said first optical star coupler; a second local network including a second optical star coupler and a second plurality of terminal apparatuses coupled by a second optical star coupler; and a repeater provided between the first optical star coupler and said second optical star coupler for executing bidirectional communication, wherein said repeater comprises:
at least two signal input terminals;
at least two signal output terminals;
data adding means for adding ID data of the repeater to a frame signal received at one input terminal of said at least two signal input terminals and for transmitting said frame signal; and means for inhibiting a repetition of said frame signal received at an opposite input terminal of said at least two signal input terminals for a period from a transmission of said frame signal having said ID data to a reception of said transmitted frame signal having said ID data at said opposite input terminal, said inhibiting means being provided in each repeating direction of said repeater.

17. A signal transmission system comprising: a first local network including an optical star coupler and a first plurality of terminal apparatuses; a second local network including coaxial buses and a second plurality of terminal apparatuses coupled by said coaxial buses; and a repeater provided between the optical star coupler of said first local network and the coaxial buses of said second local network for executing bidirectional communication, wherein said register comprises at least two signal input terminals and at least two signal output terminals, said repeater repeating a frame signal by receiving said frame signal at one input terminal of said at least two signal input terminals, transmitting said frame signal from one output terminal of said at least two signal output terminals, receiving said transmitted frame signal returned at another input terminal of said at least two signal input terminals and transmitting said returned frame signal from another output terminal of said at least two signal output terminals, and wherein said repeater further comprises:

monitoring means for obtaining delay information corresponding to a delay from a transmission of said frame signal transmitted from said one output terminal at said other input terminal to a first reception of said frame signal transmitted from said one output terminal at said other input terminal, comprising:

a first frame detector for detecting a second reception of a signal by detecting a trailing edge of said frame signal received at said one input terminal;

a second frame detector for detecting a third reception of said signal by detecting said trailing edge of said frame signal received at said other input terminal; and counting means for counting up at a first detection of said second reception at said signal at said first framed detector and for counting down at a second detection of said third reception of said signal at said second frame detector; and means for controlling a transmission of said signal from said other output terminal corresponding to said delay information from said monitoring means, wherein, said counting means are maintained at a predetermined value before a predetermined frame signal is received, and once said predetermined frame signal is received and transmitted, said frame signal received at said other input terminal being not transmitted from said another output terminal until said counting means is at said predetermined value.

18. A signal transmission system comprising: a first local network including an optical star coupler and a first plurality of terminal apparatuses; a second local network including coaxial buses and a second plurality of terminal apparatuses coupled by said coaxial buses; and a repeater provided between the optical star coupler of said first local network and the coaxial buses of said second local network for executing a bidirectional communication, wherein said repeater comprises at least two signal input terminals and at least two signal output terminals, said repeater repeats a frame signal by receiving said frame signal at one input terminal of said at least two signal input terminals, transmitting said frame signal from one output terminal of said at least two signal output terminals, receiving said transmitted frame signal returned at another input terminal of said at least two signal input terminals and transmitting said returned frame signal from another output terminal of said at least two signal output terminals, and wherein said repeater further comprises:

monitoring means for obtaining delay information corresponding to a delay from a transmission of said frame signal from said one output terminal to a first reception of said frame signal at said other input terminal, said monitoring means comprising:

a first frame detector for detecting a second reception of a signal by detecting a trailing edge of said frame signal received at said one input terminal a second frame detector for detecting a third reception of said signal by detecting said trailing edge of said frame signal received at said another input terminal; and counting means for counting up at a first detection of said second reception at said signal at said first frame detector and for counting down at a second detection of said third reception of said signal at said second frame detector;

means for controlling a transmission of said signal from said other output terminal corresponding to said delay information from said monitoring means; and means for inhibiting the first repetition of said frame signal received a said other input terminal, and wherein, said counting means are maintained at a predetermined value before a predetermined frame signal is received, and once said predetermined frame signal is received and transmitted, and wherein when said counting means are not maintained at said predetermined value, said inhibiting means is activated.

19. A signal transmission system comprising: a first local network including an optical star coupler and a first plurality of terminal apparatuses; a second local network including coaxial buses and a second plurality of terminal apparatuses coupled to said coaxial buses; and a repeater provided between the optical star coupler of said first local network and the coaxial buses of said second local network for executing a bidirectional communication, wherein said repeater comprises at least two signal input terminals and at least two signal output terminals and said repeater repeats a frame signal by receiving said frame signal at one input terminal of said at least two signal input terminals, transmitting said frame signal from one output terminal of said at least two signal output terminals, receiving said transmitted frame signal returned at another input terminal of said at least two signal input terminals and transmitting said returned frame signal from another output terminal of said at least two signal output terminals, and wherein said repeater further comprises:

means for detecting a delay period from a transmission to a reception of said frame signal and for generating an output signal; and means for inhibiting a transmission of a signal from said other output terminal for said delay period responsive to said output signal from said detecting means, and means for switching over a data buffer in accordance with a repeating direction of said repeater.

20. A signal transmission system comprising: a first local network including an optical star coupler and a first plurality of terminal apparatuses; a second local network including a second plurality of terminal apparatuses and coaxial buses coupled to said plurality of terminal apparatus; and a repeater provided between the optical star coupler of said first local network and the coaxial buses of said second local network for executing a bidirectional communication, wherein said repeater comprises:

at least two signal input terminals;

at least two signal output terminals;

data adding means for adding ID data of the repeater to a frame signal received at one input terminal of said at least two signal input terminals and for transmitting said frame signal; and means for inhibiting a repetition of said frame signal received at an opposite input terminal of said at least two signal input terminals for a period from a transmission of said frame signal having said ID data to said reception of said transmitted frame signal having said ID data at said opposite input terminal, said inhibiting means being provided in each repeating direction of said repeater.

* * * * *